(12) United States Patent
Arrakoski

(10) Patent No.: US 9,794,942 B1
(45) Date of Patent: Oct. 17, 2017

(54) SYSTEM AND METHOD FOR SAVING ENERGY IN A LOCATOR APPARATUS

(71) Applicant: Emergence Oy, Espoo (FI)

(72) Inventor: Jori Arrakoski, Espoo (FI)

(73) Assignee: EMERGENCE OY, Espoo (FI)

( * ) Notice: Subject to any disclaimer, the term of this patent is extended or adjusted under 35 U.S.C. 154(b) by 0 days.

(21) Appl. No.: 15/257,955

(22) Filed: Sep. 7, 2016

(51) Int. Cl.
| | |
|---|---|
| *G01S 19/48* | (2010.01) |
| *G01S 19/52* | (2010.01) |
| *H04W 24/00* | (2009.01) |
| *H04W 72/04* | (2009.01) |
| *H04W 4/02* | (2009.01) |
| *H04B 17/318* | (2015.01) |
| *H04W 4/00* | (2009.01) |

(52) U.S. Cl.
CPC ...... *H04W 72/0473* (2013.01); *H04B 17/318* (2015.01); *H04W 4/02* (2013.01); *H04W 4/008* (2013.01)

(58) Field of Classification Search
None
See application file for complete search history.

(56) References Cited

U.S. PATENT DOCUMENTS

| | | | | |
|---|---|---|---|---|
| 2010/0317368 | A1* | 12/2010 | Augst | H04W 4/16 455/456.1 |
| 2012/0321112 | A1* | 12/2012 | Schubert | H04R 25/43 381/312 |
| 2013/0182575 | A1* | 7/2013 | McLean | H04L 47/122 370/237 |
| 2014/0278044 | A1* | 9/2014 | Jacobs | G06F 17/00 701/300 |

* cited by examiner

*Primary Examiner* — Moustapha Diaby
(74) *Attorney, Agent, or Firm* — Ziegler IP Law Group, LLC

(57) ABSTRACT

A method for saving energy in a locator apparatus includes calculating an update threshold as a function of energy available in the locator apparatus, movement detection and location detection; performing a location update when the update threshold is exceeded; and transmitting the location update to a server using communication channel selected based on energy efficiency of the communication channel at the time of the transmission. The energy efficiency is determined by measuring received signal strength from each communication channel; adding a predefined protocol overhead to an amount of data of the location update to be transmitted to obtain an actual amount of data of the location update to be transmitted, for each communication channel; performing a conversion from the actual amount of data of the location update to energy required for transmission using each communication channel; and selecting the communication channel having the lowest requirement of energy for transmission.

12 Claims, 5 Drawing Sheets

SYSTEM AND METHOD FOR SAVING ENERGY IN A LOCATOR APPARATUS

TECHNICAL FIELD

The present disclosure relates generally to location detection devices, and more specifically, to a system and a method for saving energy in a locator apparatus.

BACKGROUND

Location detection devices are used to monitor and/or track target objects (e.g. people or goods). The location detection devices typically include components such as a transmitter, a receiver, one or more sensors and a processor. Each of these components may consume energy and power while functioning, which is provided by a battery that is present within the location detection device. The energy consumption is particularly high while communicating with a server, which mandates charging the location detection device frequently.

Therefore, in light of the foregoing discussion, there exists a need to overcome the aforementioned drawbacks in existing location detection systems due to high power consumption, which makes them unsuitable to be powered using energy harvesting sources such as solar cells.

SUMMARY

The present disclosure provides a method for saving energy in a locator apparatus, wherein the locator apparatus comprises a movement detector, a satellite positioning device, a group of communication channels comprising at least two communication channels, a battery, means for harvesting energy and a processor comprising a memory, said memory storing allowed position of the locator apparatus as a function of time and a set of instructions for performing a location update, the method comprising
    calculating an update threshold as a function of energy available in the locator apparatus, movement detection and location detection,
    performing a location update when the update threshold is exceeded, and
    transmitting the location update to a server, using a selected communication channel, the selection being based on energy efficiency of the communication channel at the time of the transmission, wherein the energy efficiency is determined by
        measuring received signal strength from each communication channel,
        adding a predefined protocol overhead to an amount of data of the location update to be transmitted, to obtain an actual amount of data of the location update to be transmitted, for each communication channel,
        performing a conversion from the actual amount of data of the location update to energy required for transmission using each communication channel, and
        selecting the communication channel having the lowest requirement of energy for transmission.

The present disclosure also provides a locator apparatus comprising
    a movement detector,
    a satellite positioning device,
    a group of communication channels comprising at least two communication channels,
    a processor comprising a memory, said memory being configured to store allowed position of the locator apparatus as a function of time and a set of instructions for performing a location update,
    a battery, and
    means for harvesting energy,
wherein the processor is configured to
    calculate an update threshold as a function of energy available in the locator apparatus, movement detection and location detection,
    perform a location update when the update threshold is exceeded, and
    transmit the location update to a server, using a selected communication channel, the selection being based on energy efficiency of the communication channel at the time of the transmission, wherein the processor is configured to
        measure received signal strength from each communication channel,
        add a predefined protocol overhead to an amount of data of the location update to be transmitted, to obtain an actual amount of data of the location update to be transmitted, for each communication channel,
        perform a conversion from the actual amount of data of the location update to energy required for transmission using each communication channel, and
        select the communication channel having the lowest requirement of energy for transmission.

The present disclosure further provides a system for saving energy in a locator apparatus, the system comprising a server and at least one locator as described above, wherein the server comprises at least one database and the at least one database comprises information of allowed position of the at least one locator apparatus as a function of time and allowed limits of measurement data from the movement detector as a function of time.

Embodiments of the present disclosure substantially eliminate or at least partially address the aforementioned problems in the prior art, and save energy in a locator apparatus by selecting a communication channel having the lowest requirement of energy for transmission, and efficiently using components of the locator apparatus when needed while monitoring safety and a location of a target object (e.g. people and goods).

Additional aspects, advantages, features and objects of the present disclosure are made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
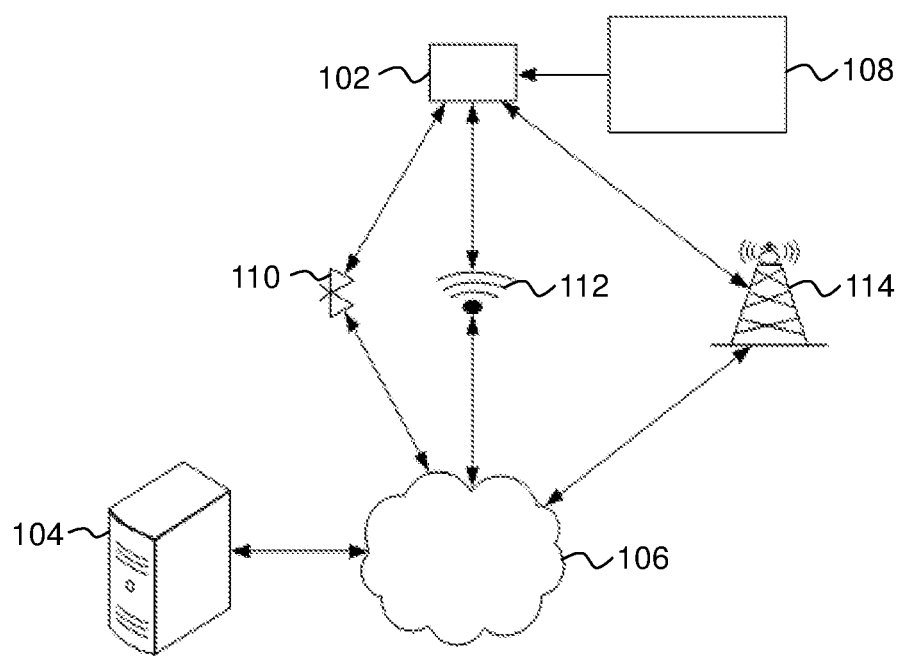
FIG. 1 is a schematic illustration of a system in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible. For examples, embodiments may be created using software, or using a FPGA(s), or by using an ASIC(s).

The present disclosure provides a method for saving energy in a locator apparatus, wherein the locator apparatus comprises a movement detector, a satellite positioning device, a group of communication channels comprising at least two communication channels, a battery, means for harvesting energy and a processor comprising a memory, said memory storing allowed position of the locator apparatus as a function of time and a set of instructions for performing a location update, the method comprising
calculating an update threshold as a function of energy available in the locator apparatus, movement detection and location detection,
performing a location update when the update threshold is exceeded, and
transmitting the location update to a server, using a selected communication channel, the selection being based on energy efficiency of the communication channel at the time of the transmission, wherein the energy efficiency is determined by
measuring received signal strength from each communication channel,
adding a predefined protocol overhead to an amount of data of the location update to be transmitted, to obtain an actual amount of data of the location update to be transmitted, for each communication channel,
performing a conversion from the actual amount of data of the location update to energy required for transmission using each communication channel, and
selecting the communication channel having the lowest requirement of energy for transmission.

The method of saving energy in the locator apparatus may minimize energy consumption by establishing a communication with minimum energy utilization, by switching a satellite positioning device (e.g. a GPS or a GLONASS) on only when an accurate location of the locator apparatus is needed. The method may manage energy consuming operations of the locator apparatus, especially communication. The method also stores a map comprising a list of radio base stations locally in a memory of the locator apparatus. The method may manage the energy consumption of the locator apparatus by estimating energy consumption based on behavioral statistics of the locator apparatus. The locator apparatus may minimize the energy consumption by communicating with other locator apparatuses that are in the vicinity. For example, if several locator apparatuses are available within a short radio range, these can communicate with each other and choose one locator apparatus for communicating with the server.

The method of saving energy in the locator apparatus enables the locator apparatus to efficiently monitor a location and safety of a target object (e.g. people or goods) using energy from an energy harvesting arrangement (e.g. solar cells). The method of saving energy in the locator apparatus enables the locator apparatus to execute its functions through a set of instructions to consume as little energy as possible. The method may use the set of instructions comprising predefined parameters and operational rules, defined by the server, to minimize energy consumption of the locator apparatus. The set of instructions of the locator apparatus may be further modified based on behavioral statistics recorded by the locator apparatus.

As communication is the most energy consuming operation of the locator apparatus, the method may determine an activation time for the locator apparatus to communicate the location update based on a signal received from the movement detector, a signal received from one or more secondary communication channels (e.g. selected from a Low-Power Wide-Area Network, a wireless local area network and a Bluetooth), a signal received from a timing unit, an external trigger signal comprising measurement data received from sensors (e.g. a movement detector and a location detector), and/or a set of instructions received from the server. In an embodiment, the signal may be received from secondary communication channels when a mobile radio is off in order to save energy. The method may further identify a communication channel that is energy efficient for communicating the location update to a backend server. The method may further help the locator apparatus to utilize minimum amount of energy required for establishing a communication between the locator apparatus and the server.

The server receives the location update from the locator apparatus. The location update may comprise a location of the locator apparatus and a location history of the locator apparatus. The location update may comprise a charge level of the locator apparatus and sensory data associated with the locator apparatus (e.g. temperature, air pressure and radiation sensed by the locator apparatus). The location update may further comprise historical/time-series data of the sensory data, the location and internal device parameters, such as a radio signal strength indicator (RSSI), a charge level of the battery, available channels for communication, and other operative parameters. The other operative parameters comprise usage statistics, such as device status/mode, energy harvesting information, internal temperature of device, information related to connections to other devices, information related to data requests from device internal and external hardware modules. The server further provides a user interface to enable a user to track target objects. The user may be an administrator or a manager who uses the locator apparatus and/or the server to access and track location information and/or other information associated with the targets. The server may further receive data (e.g. a base station location/identity map, an access point map, beacons etc.) from third party sources (e.g. a third party server). The server may further receive data (e.g. behavioral statistics) related to an end user's calendar, friends/trusted persons, mobile parameters and other device parameters. The end user may be associated with a location apparatus. In one embodiment, the end user may be a child who carries or wears the location apparatus. In another embodiment, the end user may be a person involved in transportation of the target object associated with a location apparatus. Based on the location update, behavioral statistics of the locator apparatus, and data received from third party sources, the server may create a new set of instructions on which environmental conditions are safe/unsafe/unknown at any given time and communicates that set of instructions to the locator apparatus. The locator apparatus may sense various environmental conditions using its radios and sensors.

In an embodiment, the means for harvesting energy (e.g. an energy harvesting arrangement) may be selected from a solar cell, a wind mill, thermal energy, an electromagnetic energy harvester, kinetic module, etc. In an embodiment, the processor co-ordinates and executes all functions of the locator apparatus. In an embodiment, an occurrence of energy consuming operations of the locator apparatus may be adjusted dynamically based on the energy harvested by the locator apparatus from the means for harvesting energy. If the energy available in the locator apparatus is below a predefined threshold, the locator apparatus may delay operations (e.g. a location detection operation or a movement detection operation) based on the set of instructions. The locator apparatus may not perform a subsequent operation (e.g. a temperature detection operation or any other operations of the locator apparatus) until the energy available in the locator apparatus is above the predefined threshold.

According to one embodiment, the locator apparatus comprises at least one further sensor. The update threshold may also be a function of the measurement data from said at least one further sensor. The at least one further sensor may be a temperature sensor, a proximity sensor, a humidity sensor, an air pressure sensor, a fill level gauge or a radiation sensor, etc. The fill level gauge is used to measure fill level of a container or a tank. The at least one further sensor may be configured to perform measurements, which configuration is received with the set of instructions. The location update set of instructions comprises allowed ranges for the sensor measurement results. As an example of an instruction in the set of instructions, the locator apparatus may be configured to measure temperature of a target object periodically and if the temperature is outside a given range an alert is triggered and communicated to the server. The set of instructions is typically a combination function of various measurements of data and time.

According to another embodiment, the location update is performed using the satellite positioning device. The satellite positioning device may identify an exact geographical position of a target object (e.g. people or goods) to provide the location update.

According to yet another embodiment, the location updates are performed using at least one of the communication channels and one of triangulation, trilateration and proximity detection. The communication channel may be selected from short range radio communication (e.g. Bluetooth, wireless fidelity, (Wi-Fi) or a Zigbee, etc.), or a long range radio communication (e.g. global system for mobile communication (GSM), third generation (3G) or fourth generation (4G), a fifth generation (5G), a satellite radio communication, e.g Iridium or Globalstar etc.).

According to yet another embodiment, the calculation of the update threshold is performed at pre-defined time intervals, upon request by the server and/or upon deviation from the allowed position. The server may be a cloud service.

The present disclosure provides a locator apparatus comprising
- a movement detector,
- a satellite positioning device,
- a group of communication channels comprising at least two communication channels,
- a processor comprising a memory, said memory being configured to store allowed position of the locator apparatus as a function of time and a set of instructions for performing a location update,
- a battery, and
- means for harvesting energy, wherein the processor is configured to
- calculate an update threshold as a function of energy available in the locator apparatus, movement detection and location detection,
- perform a location update when the update threshold is exceeded, and
- transmit the location update to a server, using a selected communication channel, the selection being based on energy efficiency of the communication channel at the time of the transmission, wherein the processor is configured to
  - measure received signal strength from each communication channel,
  - add a predefined protocol overhead to an amount of data of the location update to be transmitted, to obtain an actual amount of data of the location update to be transmitted, for each communication channel,
  - perform a conversion from the actual amount of data of the location update to energy required for transmission using each communication channel, and
  - select the communication channel having the lowest requirement of energy for transmission.

The locator apparatus monitors a location and safety of a target object (e.g. people and/or goods). The locator apparatus may generate a location update when the update threshold is exceeded. The advantages of the present locator apparatus are thus identical to those disclosed above in connection with the present method. Indeed, the locator apparatus may communicate the location update to the server through a communication channel, which is the most energy efficient. The locator apparatus may thus reduce utilization of energy substantially when establishing a communication with the server.

The locator apparatus may be a phone chip and a speaker combination, a laptop, a mobile and/or a personal communication device, etc. The movement detector detects any movements of a target object (e.g. people or goods). The movement detector is often integrated as a component of a system that automatically performs a task or alerts motion of a target object in an area. The movement detector may be an ultrasonic movement detector, a passive infrared movement detector, a laser movement sensor, a contact positioning sensor, an accelerometer sensor, a proximity detector, a gyroscope, a magnetometer sensor, a tomographic motion detector or a microwave sensor.

The satellite positioning device may be switched on only when an accurate location of a target object (e.g. people/goods) needs to be detected. In an embodiment, the locator apparatus receives a request from a system to detect the accurate location of the target object. In another embodiment, the satellite positioning device receives a request to detect the accurate location of the target object when no other communication signal is received. In an embodiment, the communication channel comprises a short range radio base station/access point (e.g. a Bluetooth or a Zigbee, etc.). In another embodiment, the communication channel comprises a long range radio base station/access point (e.g. a global system for mobile communication base station). The locator apparatus may eliminate known access points (e.g. user's own apparatus such as a smart phone or a laptop, etc.) from a list of access points.

The satellite positioning device may provide a location and time information of a target object in all weather conditions, anywhere on or near the Earth where there is an unobstructed line of sight to at least four or more global positioning system satellites. The satellite positioning device may be a global positioning system receiver, a global positioning system navigator, a vehicle tracking device or a pet animal tracking device. The satellite positioning device may monitor the position and retrieve the location of the people or goods. The processor co-ordinates and executes all functions in the locator apparatus. The processor may be a cortex processor, an embedded processor, an advanced reduced instruction set computer machines (ARM) processor or a reduced instructions set computer (RISC) processor etc.

The group of communication channels may comprise a short range radio communication (e.g. Bluetooth, wireless fidelity, (Wi-Fi) or a Zigbee, etc.), or a long range radio communication (e.g. global system for mobile communication (GSM), third generation (3G) or fourth generation (4G), etc.).

In an embodiment, the communication channel is selected based on energy efficiency of the communication channel at the time of the transmission (e.g. transmission power estimation). This transmission power estimation may be added to a fairly static connection establishment. The associated transmission power estimation for each of the available communication channels may be calculated and stored within a memory of the locator apparatus. The stored transmission power estimation of the available communication channels may enable the locator apparatus to select a communication channel that is energy efficient for communicating with the server. The locator apparatus may establish the communication with the server through the selected communication channel, and transmit the location update to the server. The location update may comprise a current location, a location history, a status of the locator apparatus, a charge level of the locator apparatus, and/or sensor data. The locator apparatus may receive set of instructions from the server based on the location update. The battery may be a rechargeable battery or a lithium-ion battery, etc. In an embodiment, the means for harvesting energy (e.g. an energy harvesting arrangement and solar cells) may harvest energy, and charge a battery of the locator apparatus. For example, the solar cell coupled with the locator apparatus may harvest electrical energy, and charge the battery of the locator apparatus.

A behavior of the locator apparatus, specifically communication behavior, may depend on a charge level of the locator apparatus, and an amount of energy received from an energy harvesting arrangement. The behavior of the locator apparatus may be defined based on a learned schedule (e.g. a day and a time of day) that is received from the server. In an embodiment, the locator apparatus communicates its behavioral statistics to the server. The behavioral statistics of the locator apparatus may comprise data related to the locator apparatus (e.g., a location of the locator apparatus, and when and what has the locator apparatus been sensed and recorded) or third party data (e.g. a calendar and/or school opening times, etc.). The server may analyze behavioral statistics of the locator apparatus to estimate an amount of energy needed for the locator apparatus, and communicate configuration parameters (e.g. set of instructions) to the locator apparatus to manage energy consumption of the locator apparatus. In an embodiment, the behavioral statistics of the locator apparatus may be collected and communicated to the server for determining profile data based on accelerometer data comprising a number of movements above a predefined threshold, geofence data comprising a number of movements above a predefined threshold in an allowed geofence area, and a number of location requests and location results.

The locator apparatus may map radio base stations/access points with the satellite positioning device, and maintain a map locally within a memory of the locator apparatus. The locator apparatus may communicate a list of mapped radio base stations/access points to the server. The server may receive the list of mapped base stations/access points, and respond with messages (e.g. an unknown access point or a personal access point) to the locator apparatus for detecting a location or a location database for the base stations/access points. In an embodiment, the server uses a cellular identity (cell ID) and a location database for mapping the location of the base stations/access points based on cellular signals. The server may further use observed time difference of arrival (OTDOA) to obtain more accurate location of the base stations/access points using the cellular signals. In an embodiment, the data that are collected using a long and/or a short range radio communication may be used to generate the location database for more accurate radio communication signal based positioning.

In an embodiment, the locator apparatus communicates with nearby other locator apparatus. For example, if several locator apparatuses are available within a short radio range, these can communicate with each other and choose one locator apparatus responsible for communicating with the server. In an embodiment, the nearby locator apparatus may need an application to connect and communicate the location update/data to the server.

According to one embodiment, the means for harvesting energy is at least one of a solar cell, a kinetic module and an electromagnetic energy harvester. The means for harvesting energy (e.g. an energy harvesting arrangement) may harvest energy, and provide the energy to the locator apparatus that does not require any charging manually. The means for harvesting energy may be a wind mill or means for harvesting thermal energy.

According to another embodiment, the communication channels are selected from cellular networks, low-power wide-area networks and short range broadband radio communication channels.

According to yet another embodiment, the locator apparatus comprises at least one further sensor. According to yet another embodiment, the at least one further sensor is selected from a temperature sensor, a humidity sensor, a radiation sensor, an air pressure sensor, a fill level gauge and a light sensor, as has been discussed above. The at least one further sensor may sense environmental conditions, and maximize an accuracy in monitoring a location and safety of a target object.

The present disclosure provides a system for saving energy in a locator apparatus, the system comprising a server and at least one locator apparatus according to any of the embodiments, wherein the server comprises at least one database and the at least one database comprises information of allowed position of the at least one locator apparatus as a function of time and allowed limits of measurement data from the movement detector as a function of time. The advantages of the present system are thus identical to those disclosed above in connection with the present method.

The system may calculate an update threshold as a function of energy available in the at least one locator apparatus, movement detection and location detection. The system may perform a location update when the update threshold is exceeded. The system may transmit the location update to a server, using a selected communication channel, and the selection being based on energy efficiency of the communication channel at the time of the transmission. The system may transmit the location update to one or more servers. The system may determine an energy efficiency of the communication channel (e.g. a short range radio communication channel or a long range radio communication channel) by measuring received signal strength from each communication channel, adding a predefined protocol overhead to an amount of data of the location update to be transmitted, to obtain an actual amount of data of the location update to be transmitted, for each communication channel, performing a conversion from the actual amount of data of the location update to energy required for transmission using each communication channel and selecting the communication channel having the lowest requirement of energy for transmission.

The system may identify the communication channel that is energy efficient for communicating with a server (e.g. a backend server). The system may thus reduce utilization of energy substantially when establishing a communication between the at least one locator apparatus and the server. In an embodiment, one or more locator apparatuses may communicate with the server to receive a set of instructions from the server. In another embodiment, the locator apparatus may communicate with one or more servers to receive the set of instructions.

According to one embodiment, the at least one locator apparatus comprises at least one further sensor and the at least one database comprises allowed limits of measurement data from the at least one further sensor as a function of time.

In an example embodiment, a locator apparatus that is attached on an external top of a target object is provided. The target object may be a refrigerated container. The locator apparatus obtains set of instructions from a server to initialize the locator apparatus. The locator apparatus tracks a location of the refrigerated container. The locator apparatus may communicate a location update of the refrigerated container to a server through an efficient means of communication channel. In an embodiment, the set of instructions may be created by the server based on measurement data received from the locator apparatus, and other data received from third party sources. The set of instructions may comprise predefined parameters, and operational instructions that are configured to trigger a location update by the locator apparatus. In an embodiment, the set of instructions may be modified using the server based on behavioral statistics received from the locator apparatus. In another embodiment, based on the location update, behavioral statistics of the locator apparatus, and data received from third party sources, the server may create set of instructions again on which environmental conditions are safe/unsafe/unknown at any given time, and communicate that set of instructions to the locator apparatus.

In an embodiment, based on the set of instructions received from the server, the locator apparatus calculates an update threshold as a function of energy available in the locator apparatus, the movement detector and the location detector, and trigger a location update of the refrigerator device when a threshold update is exceeded. The triggering of the location update may depend on geofence areas and positioning parameters set by the server, communication parameters and data expiration parameters. For example, the geofence areas comprise co-ordinates of four corners of a square with side 100 meters. The positioning parameters may comprise, for example, a tracking of the locator apparatus when exceeding 20 meter, or 10 meter outside of the geofence area, a tracking of positioning, and a tracking of timer between position tracking and reporting of the positioning.

In an embodiment, the communication channel comprises communication parameters. The communication parameters may comprise parameters for configuring a 2G, a 3G or a WIFI channel that optimize cost in communication or cloud communication windows (e.g. once per day). In an embodiment, switching the communication from the WIFI to the 2G may minimize energy consumption of the locator apparatus by less than 10%. The communication parameters may comprise communication data weights. For example, 100% validity until two hours older then linearly dropping to 0% validity at 48 hours and expiration points as communication data may not be valid after 48 hours.

In an embodiment, the location update may be triggered based on other parameters (e.g. the data expiration times and weights as 100% validity until 3 hours dropping linearly to 0% in 5 days, a target as 4° C., alarm temperatures as 8° C., alarm triggering point as 7.5° C. and temperature trend shift trigger as 0.2° C.). The locator apparatus may identify all available communication channels for connectivity. The locator apparatus may select a communication channel that is energy efficient (e.g. making the efficient communication channel as default for communication) and switches off the other available communication channels. The locator apparatus may store determined values (e.g. internet availability, receiver sensitivity, transmission power, data rate or transmission power estimation, etc.) of all available communication channels for subsequent use. The locator apparatus may obtain set of instructions from the server and start the operation.

In an embodiment, a location update for the locator apparatus may be the triggered based on a triggering event. The triggering event may be a time triggered positioning, a movement triggered positioning, a continuous movement, a temperature triggered positioning, an old data triggered positioning or a cloud triggered positioning.

In an embodiment, the locator apparatus may be triggered based on the time triggered positioning to start its operation for every predetermined time interval as defined in the set of instructions. The locator apparatus may determine whether a movement of the refrigerator container that is detected using a movement detector of the locator apparatus is outside of the allowed geofence area. If the movement of the refrigerator container that is measured is outside of the allowed geofence area, the locator apparatus may establish a communication with the server to communicate a positioning of the refrigerator container.

The locator apparatus may detect a position of the refrigerator container and determine whether the position of the refrigerator container is detected within allowed geofence area. When the position of the refrigerator container is not detected within the allowed geofence area, the locator apparatus may estimate a position change of the refrigerator container and store the position change of the refrigerator container within a memory of the locator apparatus. In an embodiment, the locator apparatus connects to a new communication channel when a communication change is triggered. The locator apparatus may determine whether a satellite positioning device needs an assisted global positioning system (A-GPS) for less energy consumption. If the satellite positioning device needs the assisted global positioning system, the locator apparatus may establish a communication to fetch the assisted global positioning system data and start the satellite positioning device. Else, the locator apparatus may directly start the satellite positioning device. If a position of the satellite positioning device is outside the allowed geofence area, a location update comprising a new position of the refrigerator container is communicated to the server. The locator apparatus may measure a temperature range associated with the refrigerator container using a temperature sensor and store the temperature range within the memory of the locator apparatus. The locator apparatus may analyze a temperature trend of the refrigerator container and generate a location updated when the measured temperature range exceeds a threshold temperate range. The locator apparatus may combine above measured data (e.g. positioning data, movement data and temperature data, etc.) and generate a location update to communicate with the server using the default communication channel. After reporting the location update, the locator apparatus may go to sleep mode until it receives a new trigger.

In another embodiment, the locator apparatus may be triggered based on the movement triggered positioning. For example, the locator apparatus may be triggered when a movement sensor senses a movement of the refrigerator container that exceeds a threshold level (e.g. 5 meter or 10 meter). The locator apparatus may determine whether a movement of the refrigerator container is detected using the movement detector of the locator apparatus is outside or inside of the allowed geofence area. If the movement of the refrigerator container is measured outside of the allowed geofence area, the locator apparatus may establish a communication with the server to communicate a positioning of the refrigerator container. Thereafter, the locator apparatus may carry out temperature measurement as explained above.

In another embodiment, the locator apparatus is triggered based on continuous movement which is a subset of the movement triggered positioning. The locator apparatus may not be designed to be a real-time positioning device, so the real-time positioning tracking is limited based on available energy/power in the locator apparatus. The continuous movement of the locator apparatus may be tracked as described above on the movement triggered positioning and the time triggered positioning. A timer for the time triggered positioning may be defined by set of instructions received from the server and may be modified based on available energy, energy harvesting trend and estimate and estimated energy consumption trends. The actual timer for the time triggered positioning may deviate substantially from the parameter in case of low energy levels in a battery of the locator apparatus.

In yet another embodiment, the locator apparatus may be triggered based on the temperature triggered positioning. For example, the locator apparatus that comprises a temperature sensor may sense temperature associated with the refrigerator container periodically, and store the temperature within a memory of the locator apparatus. The locator apparatus may analyze a temperature trend of the refrigerator container. If the temperature trend comprises minor change in the temperature, a temperature measurement timer may be set to a larger value (e.g. 2 hours, 3 hours). If the temperature trend comprises major change in the temperature, a temperature measurement timer may be set to a smaller value (e.g. 10 minutes, 15 minutes). The locator apparatus may determine whether a movement of the refrigerator container is detected using the movement detector of the locator apparatus is outside of the allowed geofence area, as explained above. After reporting the location update, the locator apparatus may go to sleep mode until it receives a new trigger. If the temperature trend exceeds alarm temperature level, the locator apparatus may be requested to detect immediate positioning, and report the location update to the server with focus on fast action rather than energy consumption. An assisted global positioning system or other communication channel may be needed to find fastest and most reliable communication.

In yet another embodiment, the locator apparatus may be triggered based on previous data triggered positioning. The locator apparatus may be triggered when a positioning data, a temperature data or a communication data expires. For example, the positioning data may be expired in one day. If the positioning data is expired, the locator apparatus is triggered to detect a positioning of the refrigerator container, and generate a location update comprising positioning of the refrigerator container to communicate to the server. Similarly, if the temperature data is expired, the locator apparatus is triggered to detect a temperature range of the refrigerator container and generate a location update comprising the temperature range of the refrigerator container to communicate to the server. Similarly, if the communication data is expired, the locator apparatus may identify all available communication channels for connectivity and select the most energy efficient communication channel. The selected energy efficient communication channel is set as the default communication channel and switches off the other communication channels.

In yet another embodiment, the locator apparatus may be triggered based on the cloud triggered positioning. The cloud triggered positioning exists only when a communication link to the server is established. The server stores the user request and provides a set of instructions to the locator apparatus once the communication link is established. In an embodiment, a selection of the communication channel is as has been described above, even though the typical establishment of a cloud communication link may occur in a fixed position. Further, a movement of the locator apparatus may comprise communication to the cloud (e.g. a server) while reporting a new position (e.g. a location update) of the locator apparatus. The locator apparatus, in addition to providing a location update, establishes a cloud communication with regular or irregular intervals (i.e. based on settings of the locator apparatus) to reduce a system delay for user triggered actions. The cloud triggered activities may be equal to the triggered activities of the locator apparatus as described above with an exception of reporting the location update.

Embodiments of the present disclosure may be used to save energy in the locator apparatus by selecting a communication channel having the lowest requirement of energy for transmission. Further, the embodiments may efficiently use components of the locator apparatus when needed while monitoring safety and a location of a target object (e.g. people and goods), thereby saving energy in the locator apparatus.

DETAILED DESCRIPTION OF THE DRAWINGS

FIG. 1 is a schematic illustration of a system in accordance with an embodiment of the present disclosure. The system comprises at least one locator apparatus 102, a server 104, a cloud 106, a target object 108, and a group of communication channels. The group of communication channels may comprise a short range communication channel or a long range communication channel. The short range communication channel may be a Bluetooth communication 110 or a wireless fidelity communication 112. The long range communication channel may be a global system for mobile communication 114. The server 104 comprises at least one database that comprises information of allowed position of the at least one locator apparatus 102 as a function of time and allowed limits of measurement data from a movement detector of the at least one locator apparatus 102 as a function of time. The at least one locator apparatus 102 may communicate with the server 104 through the cloud 106 using a communication channel selected from the group of communication channels. The at least one locator apparatus 102 may calculate an update threshold as a function of energy available in the at least one locator apparatus 102, a movement detector and a location detector (e.g. a satellite positioning device or a global positioning system) of the at least one locator apparatus 102. The at least one locator apparatus 102 may perform a location update when the update threshold is exceeded. The at least one locator apparatus 102 may transmit the location update to the server 104 through the cloud 106 using a selected communication channel (e.g. the Bluetooth communication 110, the wireless fidelity communication 112 or the global system for mobile communication 114), the selection being based on energy efficiency of the communication channel at the time of the transmission. The server 104 may communicate a set of instructions to the at least one locator apparatus 102 for performing a location update.

Figure 2:
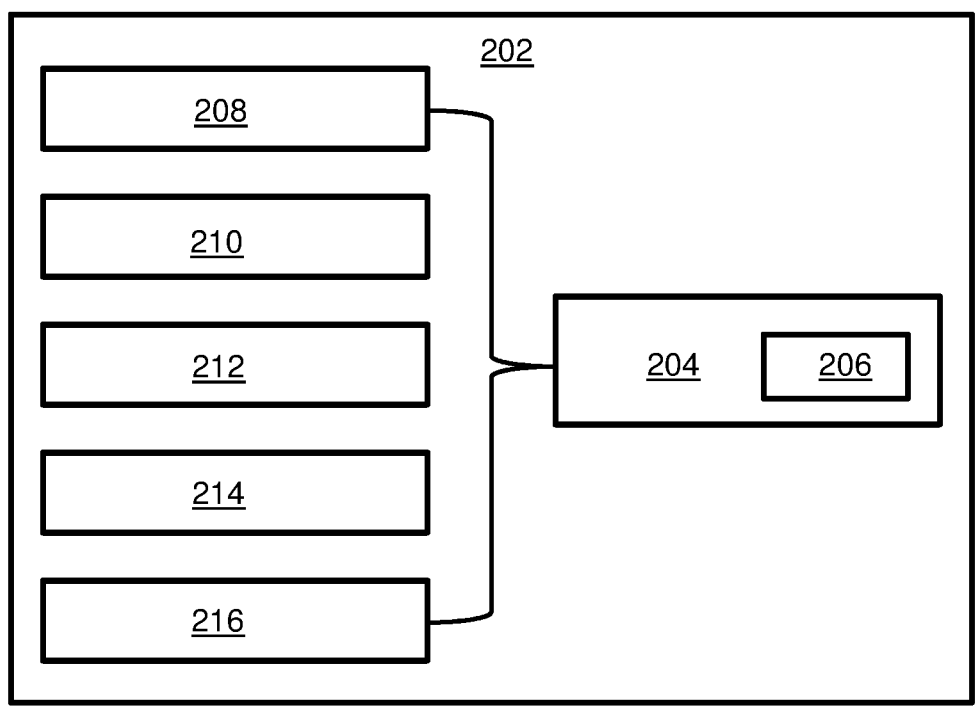
FIG. 2 is a functional block diagram of a locator apparatus in accordance with an embodiment of the present disclosure.

Referring to FIG. 2, illustrated is a functional block diagram of a locator apparatus 202 in accordance with an embodiment of the present disclosure. The locator apparatus 202 comprises a processor 204 that comprises a memory 206, a movement detector 208, a satellite positioning device 210, a group of communication channels 212, a battery 214 and means for harvesting energy 216. These components function as has been described above.

Figure 3:
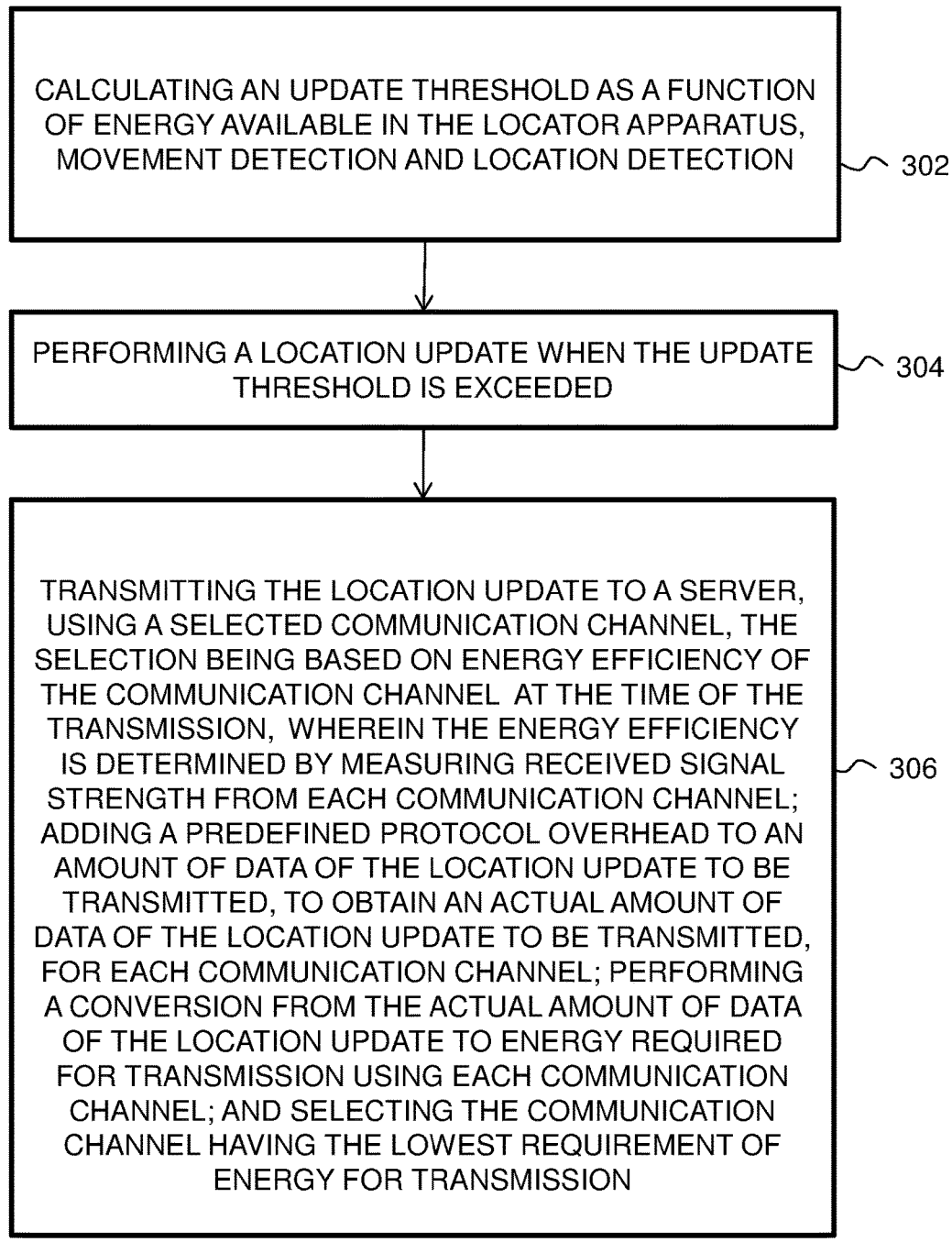
FIG. 3 is a flow diagram that illustrates a method for saving energy in a locator apparatus in accordance with an embodiment of the present disclosure.

FIG. 3 is a flow diagram that illustrates a method for saving energy in a locator apparatus in accordance with an embodiment of the present disclosure. At step 302, an update threshold is calculated as a function of energy available in the locator apparatus, movement detection and location detection. At step 304, A location update is performed when the update threshold is exceeded. At step 306, the location update is transmitted to a server using a selected communication channel, and the selection of the communication channel is based on energy efficiency of the communication channel at the time of the transmission, wherein the energy efficiency of the communication channel may be determined by measuring received signal strength from each communication channel; adding a predefined protocol overhead to an amount of data of the location update to be transmitted, to obtain an actual amount of data of the location update to be transmitted, for each communication channel; performing a conversion from the actual amount of data of the location update to energy required for transmission using each communication channel and selecting the communication channel having the lowest requirement of energy for transmission.

Figure 4:
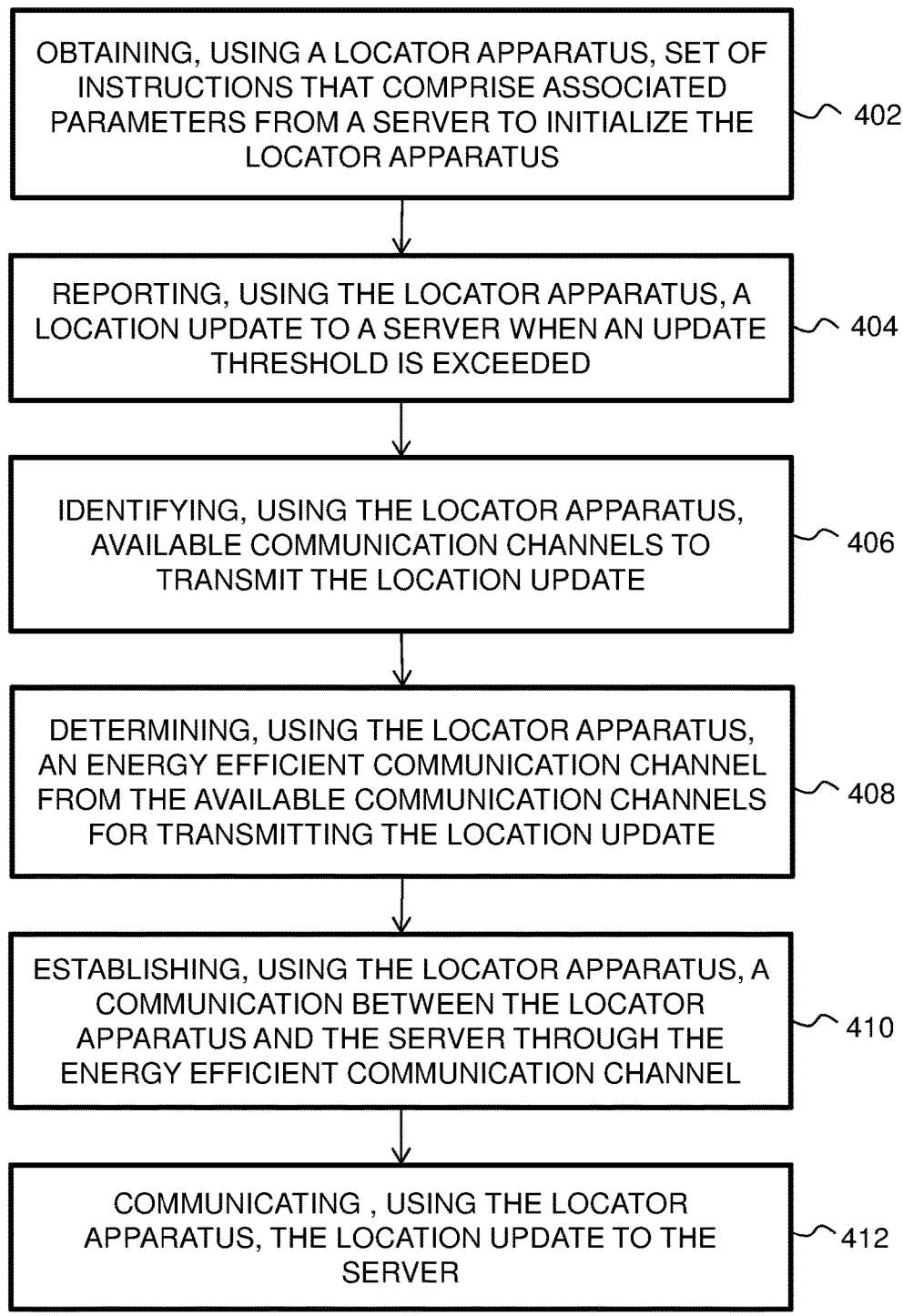
FIG. 4 is a flow diagram that illustrates a method performed in a locator apparatus in accordance with an embodiment of the present disclosure.

FIG. 4 is a flow diagram that illustrates a method performed in a locator apparatus in accordance with an embodiment of the present disclosure. At step 402, the locator apparatus obtains instructions that comprise a set of instructions and associated parameters from a server to initialize the locator apparatus. The set of instructions may comprise an activation time for the locator apparatus, an allowed geofence area for the locator apparatus, allowed ranges of sensor parameters associated with the locator apparatus, known communication parameters (e.g. a friend locator apparatus and a server address, etc.), and/or a definition of what to report. At step 404, the locator apparatus reports a location update to the server when an update threshold is exceeded. The update threshold may be calculated as has been described above. The location update may be reported to the server based on an amount of data and an urgency of reporting a location of the locator apparatus. The location update may comprise a location of the locator apparatus, and a location history of the locator apparatus. The location update may comprise a charge level of the locator apparatus, and sensory data associated with the locator apparatus (e.g. temperature, air pressure, radiation of the locator apparatus). The sensory data may be configured as high priority when the locator apparatus is not available in the allowed geofence area of the locator apparatus. At step 406, the locator apparatus identifies available communication channels to transmit the location update. The available communication channels are identified by switching on a radio receiver of the locator apparatus, measuring received signal strength and storing measurements of the signal strength. At step 408, the locator apparatus determines a communication channel that is the most energy efficient from the available communication channels for transmitting the location update to the server. The energy efficiency of the communication channel may be determined as has been described above. The communication channel may provide data connection. The locator apparatus may keep track on used, preferred, or unavailable data connections. For example, the locator apparatus may detect a Wireless Fidelity access point that may require an authentication key to establish connection between the locator apparatus and the server. At step 410, the locator apparatus establishes a communication between the locator apparatus and the server through the selected communication channel. At step 412, the locator apparatus communicates the location update to the server.

Figure 5:
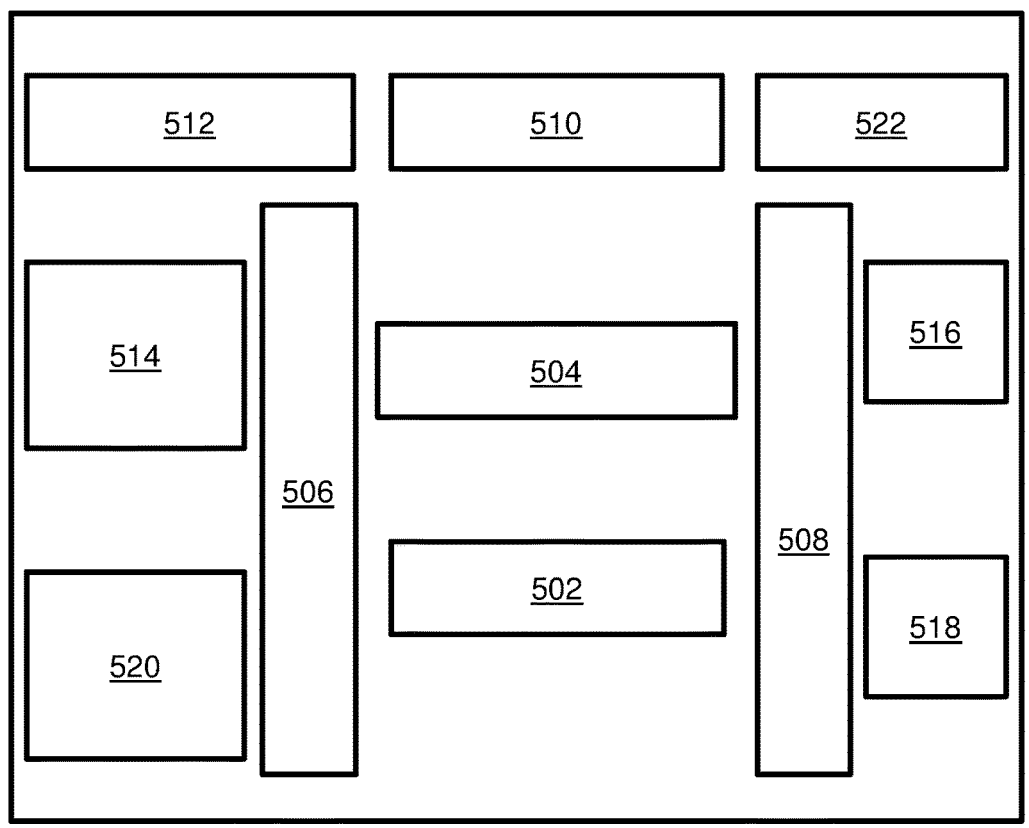
FIG. 5 illustrates a schematic diagram of a computer architecture in accordance with an embodiment of the present disclosure.

FIG. 5 is a schematic illustration of a server in accordance with an embodiment of the present disclosure. The server comprises a processor 502, a memory 504, a plurality of buses 506, 508 and 510, a power supply 512, an external bus interface 514, a Zigbee device 516, a communication interface 518, an application program interface 520 and an operating system 522. The processor 502 and the memory 504 are configurable to store data. The memory 504 may be configured as on-board memory of the processor 502 or in other forms can also include expandable memory such as DDR memory, Flash Memory, EPROM, ROM, or various other forms or any combination thereof generally illustrated as the memory 504.

The plurality of buses 506, 508 and 510 may be configured to couple data and signals to various components within the server. Although illustrated the plurality of buses 506, 508 and 510, the server may include a single bus, multiple buses or any combination thereof.

Various types of bus configurations may be used as needed or desired including, but not limited to, any combination or portion of a serial bus, a parallel bus, a serial—parallel bus, a universal serial bus, industry standard bus, controller area network bus, a serial peripheral bus, a universal asynchronous receiver transmitter bus, a control bus, standard digital input output bus or any combination thereof.

The server may also include the external bus interface 514, the communication interface 518 and the application program interface 520 or any combination thereof configurable to be coupled to the plurality of buses 506, 508 and 510 or any combination thereof. Any combination of interfaces 514, 518 and 520 may be configured in any combination of hardware, software, or firmware, and can include any combination or portion of a serial bus interface, a parallel bus interface, a serial—parallel bus interface, a universal serial bus interface, industry standard bus interface, controller area network bus interface, a serial peripheral interface, a universal asynchronous receiver transmitter interface, a control bus interface, standard digital input output interface or any combination thereof.

The power supply 512 may capable of providing power to the server. The Power supply 512 may be an internal power supply and in other forms can be provided external to the server.

The server may be configured to use any type or combination of wire line or wireless communication to manage energy use at a site, including, but not limited to, power-line communication, wire line communication, wireless communication, Zigbee based communication, INSETEON based communication, X10 based communication, Z-Wave based communication, Worldwide Interoperability for Microwave Access (WiMAX) based communication, Bluetooth based communication, Wireless Fidelity based communication, 802.11-based communication, 802.15-based communication, 802.16-based communication, proprietary communication, other communications described herein or any combination thereof. The operating system 522 may be executed by the processor 502.

The communication interface 518 may be configured to enable access to communication device, such as Zigbee device 516 accessible to the server and having access to a wireless energy network. The communication interface 518 may be configured to detect an outgoing message formatted by the processor 502 and configure the outgoing message to a message bus format that can be coupled to the bus 508 and a communication device such as the Zigbee device 516. For example, outgoing message can include network device data configured to be output to a wireless energy network, but processed into a message bus format prior to outputting to the communication device. The Communication interface 518 may then convert the outgoing message from a message bus format to a format that can be output by a specific communication device.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for saving energy in a locator apparatus, wherein the locator apparatus comprises a movement detector, a satellite positioning device, a group of communication channels comprising at least two communication channels, a battery, means for harvesting energy and a processor comprising a memory, said memory storing allowed position of the locator apparatus as a function of time and a set of instructions for performing a location update, the method comprising
   calculating an update threshold as a function of energy available in the locator apparatus, movement detection and location detection,
   performing a location update when the update threshold is exceeded, and
   transmitting the location update to a server, using a selected communication channel, the selection being based on energy efficiency of the communication channel at the time of the transmission, wherein the energy efficiency is determined by
      measuring received signal strength from each communication channel,
      adding a predefined protocol overhead to an amount of data of the location update to be transmitted, to obtain an actual amount of data of the location update to be transmitted, for each communication channel,
      performing a conversion from the actual amount of data of the location update to energy required for transmission using each communication channel, and
      selecting the communication channel having the lowest requirement of energy for transmission.

2. A method according to claim 1, wherein the locator apparatus comprises at least one further sensor and the update threshold is also function of measurement data from said at least one further sensor.

3. A method according to claim 1, wherein the location update is performed using the satellite positioning device.

4. A method according to claim 1, wherein the location update is performed using at least one of the communication channels and one of triangulation, trilateration and proximity detection.

5. A method according to claim 1, wherein the calculation of the update threshold is performed at pre-defined time intervals, upon request by the server and/or upon deviation from the allowed position.

6. A locator apparatus comprising
   a movement detector,
   a satellite positioning device,
   a group of communication channels comprising at least two communication channels,
   a processor comprising a memory, said memory being configured to store allowed position of the locator apparatus as a function of time and a set of instructions for performing a location update,
   a battery, and
   means for harvesting energy,
wherein the processor is configured to
   calculate an update threshold as a function of energy available in the locator apparatus, movement detection and location detection,
   perform a location update when the update threshold is exceeded, and
   transmit the location update to a server, using a selected communication channel, the selection being based on energy efficiency of the communication channel at the time of the transmission, wherein the processor is configured to
- measure received signal strength from each communication channel,
- add a predefined protocol overhead to an amount of data of the location update to be transmitted, to obtain an actual amount of data of the location update to be transmitted, for each communication channel,
- perform a conversion from the actual amount of data of the location update to energy required for transmission using each communication channel, and
- select the communication channel having the lowest requirement of energy for transmission.

7. A locator apparatus according to claim 6, wherein the means for harvesting energy is at least one of a solar cell, a kinetic module and an electromagnetic energy harvester.

8. A locator apparatus according to claim 6, wherein the communication channels are selected from cellular networks, low-power wide-area networks and short range broadband radio communication channels.

9. A locator apparatus according to claim 6, further comprising at least one further sensor.

10. A locator apparatus according to claim 9, wherein the at least one further sensor is selected from a temperature sensor, a humidity sensor, a radiation sensor, an air pressure sensor, a fill level gauge and a light sensor.

11. A system for saving energy in a locator apparatus, the system comprising a server and at least one locator apparatus according to claim 6, wherein the server comprises at least one database and the at least one database comprises information of allowed position of the at least one locator apparatus as a function of time and allowed limits of measurement data from the movement detector as a function of time.

12. A system according to claim 11, wherein the at least one locator apparatus comprises at least one further sensor and the at least one database comprises allowed limits of measurement data from the at least one further sensor as a function of time.

* * * * *